United States Patent
Yanai et al.

(10) Patent No.: US 8,780,564 B2
(45) Date of Patent: Jul. 15, 2014

(54) SOLENOID CONTROL APPARATUS

(75) Inventors: Koji Yanai, Toyoake (JP); Masayuki Hijikata, Nagoya (JP); Takanobu Inagaki, Nagoya (JP); Tetsuya Yoshijima, Kariya (JP); Toshimasa Miyazaki, Kariya (JP)

(73) Assignees: Advics Co., Ltd., Kariya, Aichi-Pref. (JP); Denso Corporation, Kariya, Aichi-Pref. (JP)

(*) Notice: Subject to any disclaimer, the term of this patent is extended or adjusted under 35 U.S.C. 154(b) by 240 days.

(21) Appl. No.: 13/357,018

(22) Filed: Jan. 24, 2012

(65) Prior Publication Data

US 2012/0195007 A1    Aug. 2, 2012

(30) Foreign Application Priority Data

Jan. 31, 2011 (JP) ................. 2011-018224

(51) Int. Cl.
*H05K 7/20* (2006.01)
*G06F 1/16* (2006.01)
*B60T 15/18* (2006.01)

(52) U.S. Cl.
USPC ...... 361/720; 361/679.01; 361/637; 361/749; 361/752; 303/113.1; 303/116.4; 303/119.2; 303/119.3; 137/557; 137/884

(58) Field of Classification Search
USPC ......... 361/715, 719, 720, 728, 732, 736, 742, 361/749, 752, 755, 784, 791, 795, 796, 803, 361/804, 760–767; 174/250–267; 439/55, 439/67, 76.1, 76.2, 212, 675, 744, 949; 303/3, 119, 119.2, 119.3, 113.3, 116.4
See application file for complete search history.

(56) References Cited

U.S. PATENT DOCUMENTS

| | | | | |
|---|---|---|---|---|
| 4,898,360 A | * | 2/1990 | VonHayn et al. | 251/129.01 |
| 5,022,717 A | * | 6/1991 | Heibel et al. | 303/119.3 |
| 5,040,853 A | * | 8/1991 | Burgdorf et al. | 303/119.3 |
| 5,152,322 A | * | 10/1992 | Maas et al. | 137/884 |
| 5,452,948 A | * | 9/1995 | Cooper et al. | 303/119.3 |
| 5,481,237 A | * | 1/1996 | Sarfati et al. | 335/278 |
| 5,692,813 A | * | 12/1997 | Vellmer | 303/119.2 |
| 5,777,850 A | * | 7/1998 | Jakob et al. | 361/736 |
| 5,941,282 A | * | 8/1999 | Suzuki et al. | 137/884 |
| 6,155,856 A | * | 12/2000 | Sanada | 439/246 |
| 6,164,732 A | * | 12/2000 | Tominaga et al. | 303/119.2 |

(Continued)

FOREIGN PATENT DOCUMENTS

| | | | | |
|---|---|---|---|---|
| JP | 2002-368452 A | | 12/2002 | |
| JP | 2009241702 A | * | 10/2009 | B60T 8/34 |

*Primary Examiner* — Michail V Datskovskiy
(74) *Attorney, Agent, or Firm* — Buchanan Ingersoll & Rooney PC

(57) ABSTRACT

A solenoid control apparatus includes a resin housing having a solenoid mounting portion, a connector portion, and a circuit board mounting portion in which a circuit board is mounted. Terminals extending from the solenoid mounting portion and the connector portion are soldered to the electrical circuit on the circuit board. The circuit board has a reduced-rigidity portion in its area corresponding to a portion of the resin housing through which the connector portion is connected to the solenoid mounting portion. The reduced-rigidity portion is formed by reducing the amount of material forming the circuit board per unit area, and is more easily deformable than the remaining portion of the circuit board. When the connector portion is thermally deformed, the circuit board is also easily deformable about the reduced-rigidity portion. This reduces stress on the soldered portions.

11 Claims, 4 Drawing Sheets

(56) References Cited

U.S. PATENT DOCUMENTS

| | | | |
|---|---|---|---|
| 6,241,489 B1 * | 6/2001 | Lewin et al. | 417/410.1 |
| 6,256,572 B1 * | 7/2001 | Rea | 701/71 |
| 6,634,723 B1 * | 10/2003 | Ganzel et al. | 303/119.3 |
| 6,662,825 B2 * | 12/2003 | Frank et al. | 137/557 |
| 6,802,721 B2 * | 10/2004 | Sanada et al. | 439/67 |
| 6,972,959 B2 * | 12/2005 | Asai et al. | 361/719 |
| 7,110,246 B2 * | 9/2006 | Tsunooka et al. | 361/637 |
| 7,158,372 B2 * | 1/2007 | Sanada et al. | 361/752 |
| 7,607,924 B2 * | 10/2009 | Yanai et al. | 439/76.2 |
| 7,703,862 B2 * | 4/2010 | Abe et al. | 303/119.3 |
| 7,926,782 B2 * | 4/2011 | Tsuruta | 251/129.15 |
| 8,112,196 B2 * | 2/2012 | Takayanagi | 701/36 |
| 2004/0102888 A1 * | 5/2004 | Burgdorf et al. | 701/70 |
| 2006/0017321 A1 * | 1/2006 | Tsunooka | 303/119.3 |
| 2008/0286988 A1 * | 11/2008 | Yanai et al. | 439/55 |

* cited by examiner

US 8,780,564 B2

SOLENOID CONTROL APPARATUS

CROSS REFERENCE TO RELATED APPLICATIONS

This application is based on and claims priority under 35 U.S.C. sctn. 119 with respect to Japanese Patent Application No. 2011-18224, filed on Jan. 31, 2011, the entire content of which is incorporated herein by reference.

BACKGROUND OF THE INVENTION

This invention relates to a solenoid control apparatus which is mounted e.g. in a vehicle brake hydraulic pressure control system.

Such a solenoid control apparatus is disclosed in JP Patent Publication 2002-368452A which is in the form of an electronic control apparatus for a vehicle brake hydraulic pressure control system. This electronic control apparatus includes a circuit board mounted in a resin housing and carrying an electronic control unit (ECU) thereon for driving solenoid valves to selectively connect and disconnect hydraulic lines and adjust the degree of opening of the hydraulic lines by controlling valve portions of the solenoid valves.

The housing includes a circuit board mounting portion in which the circuit board is mounted, a solenoid mounting portion in which the solenoid coils of the solenoid valves are mounted, and an overhanging connector portion extending in the direction of the top surface of the circuit board and integrally connected to one side of the solenoid mounting portion. The interior of the solenoid mounting portion is separated from the interior of the circuit board mounting portion by a partition wall of the housing. The circuit board is a rigid circuit board.

The connector portion is connected to the solenoid mounting portion through a connecting portion (bridge) which is located on an extension of the partition wall and an extension of an end wall of the connector portion. The solenoids have terminals extending through the partition plate and the circuit board and soldered to the electrical circuit on the circuit board. The connector portion has terminals for connection to the power source and a communication circuit that extend through the end wall of the connector portion and the circuit board and soldered to the electrical circuit on the circuit board.

The overhanging connector portion of the resin housing of such a solenoid control apparatus tends to be deformed (warped) by heat from the environment and heat from the electrical circuit of the circuit board.

In order to cope with such thermal deformation of the connector portion, JP Patent Publication 2002-368452A proposes to allow movement of the circuit board following deformation of the connector portion, thereby reducing stress on the soldered portions on the circuit board.

But this arrangement is unable to reduce stress due to a difference in thermal expansion between the circuit board and the resin housing. Such stress could result in cracks in the soldered portions, which could in turn cause poor electrical connection.

If, instead of soldering the terminals, the terminals are press-fitted into through holes formed in the circuit board and fixed to the electrical circuit on the circuit board, the stress due to a difference in thermal expansion could cause separation of the terminals from the holes.

SUMMARY OF THE INVENTION

An object of the present invention is to provide minimize cracks in the soldered portions, which are one of the major problems of conventional solenoid control apparatus, by reliably reducing stress due to a difference in thermal expansion coefficient between the circuit board and the housing.

In order to achieve this object, the present invention provides means for allowing the circuit board to be deformed when the connector portion of the resin housing is thermally deformed such that this deformation of the circuit board reduces stress.

Specifically, the present invention provides a solenoid control apparatus comprising a housing made of resin and including a solenoid mounting portion, an overhanging connector portion having terminals and integrally connected to one side of the solenoid mounting portion through a connecting portion, and a circuit board mounting portion provided over an area from the solenoid mounting portion to the connector portion so as to be adjacent to the solenoid mounting portion and the connector portion, a circuit board having an electronic control circuit and mounted in the circuit board mounting portion so as to be supported by the housing, the connector portion extending in a direction of one surface of the circuit board, and solenoid coils having terminals and mounted in the solenoid mounting portion, wherein the terminals of the connector portion and the terminals of the solenoid coils extend through the circuit board and are joined to the electrical circuit on the circuit board, and wherein the circuit board has a reduced-rigidity portion formed in an area of the circuit board corresponding to the connecting portion of the housing such that the reduced-rigidity portion is more easily deformable than the other portion of the circuit board. Means for making the reduced-rigidity portion more easily deformable than the other portion of the circuit board may comprise through holes, recesses or a groove formed in the circuit board, which serves to reduce the amount of material forming the circuit board per unit area.

Some preferred arrangements of the solenoid control apparatus are described below:

(1) The reduced-rigidity portion extends in a longitudinal direction of the connecting portion of the housing, as viewed from top of the circuit board.

(2) The reduced-rigidity portion comprises a plurality of through holes extending through the circuit board and spaced apart by predetermined distances from each other, and the solenoid control apparatus further comprises a heat dissipating member having heat absorbing protrusions press-fitted in the respective through holes of the circuit board for dissipating heat generated in the circuit board. The heat dissipating member is not limited to a dedicated heat dissipating member. For example, a bus bar for electric power distribution may be used as the heat dissipating member.

(3) In the arrangement (2) above, gaps are defined between the surface of each of the through holes of the circuit board and the corresponding heat absorbing protrusion in a direction perpendicular to the longitudinal direction, as viewed from top of the circuit board.

(4) In the arrangement (3) above, the gaps in the direction perpendicular to the longitudinal direction is larger than gaps that may be formed between the surface of each of the through holes of the circuit board and the corresponding heat absorbing protrusion in the longitudinal direction, as viewed from top of the circuit board.

(5) The circuit board has a wiring pattern for a power source circuit through which electric power is configured to be supplied to a motor, and the heat absorbing protrusions of the heat dissipating member are in contact with the wiring pattern. The wiring pattern may be a printed circuit on the circuit board or a bus bar for power distribution on the circuit board.

The solenoid control apparatus according to the present invention may be advantageously used as an electronic control apparatus for controlling solenoid valves and a motor of a vehicle brake hydraulic pressure control system comprising the motor, a pump driven by the motor, and the solenoid valves, which include valve portions for connecting and disconnecting hydraulic lines and adjusting the degree of opening of the hydraulic lines.

The circuit board of the solenoid control apparatus according to the present invention is has a lower rigidity and thus more easily deformable at the reduced-rigidity portion. Thus, if the connector portion of the resin housing is warped due to thermal deformation of the housing, the circuit board is bent about the reduced-rigidity portion with the reduced-rigidity portion serving as a hinge such that the portion of the circuit board overhanging the connector portion of the housing is warped in the same manner as the connector portion of the housing. This reduces stress on the joint portions of e.g. terminals to the circuit board, which in turn minimizes the possibility of cracks in the soldered portions or separation of terminals press-fitted in the circuit board.

In the arrangement in which the reduced-rigidity portion extends in the longitudinal direction of the connecting portion as viewed from top of the circuit board, the circuit board is deformed in an optimum manner such that stress can be most effectively reduced.

In the arrangement in which the reduced-rigidity portion comprises holes formed through the circuit board, and the heat absorbing protrusions of the heat dissipating member are press-fitted in the through holes, the through holes, which are formed to reduce the amount of material forming the circuit board, can also be used to couple the heat dissipating member to the circuit board. In this arrangement, gaps are preferably defined between the surface of each of the through holes of the circuit board and the corresponding heat absorbing protrusion in a direction perpendicular to the longitudinal direction, as viewed from top of the circuit board. When the circuit board is deformed, such gaps are also deformed, thereby preventing the heat absorbing protrusions from significantly reducing the freedom of deformation of the circuit board at the reduced-rigidity portion.

By setting the gaps in the direction perpendicular to the longitudinal direction to be larger than the gaps in the longitudinal direction, the reduced-rigidity portion can be deformed to a larger degree than when the gaps in the direction perpendicular to the longitudinal direction are smaller than the gaps in the longitudinal direction, so that even if the connector portion of the resin housing is thermally deformed to a relative large degree, stress can be effectively reduced.

By arranging the through hole, in which the heat absorbing protrusions of the heat dissipating member are press-fitted, so as to be in contact with a wiring pattern for a power source circuit through which electric power is configured to be supplied to a motor, heat generated from the wiring pattern when electricity is passed through the wiring pattern can be efficiently transferred to the heat dissipating member and dissipated.

DETAILED DESCRIPTION OF THE PREFERRED EMBODIMENTS

Figure 1:
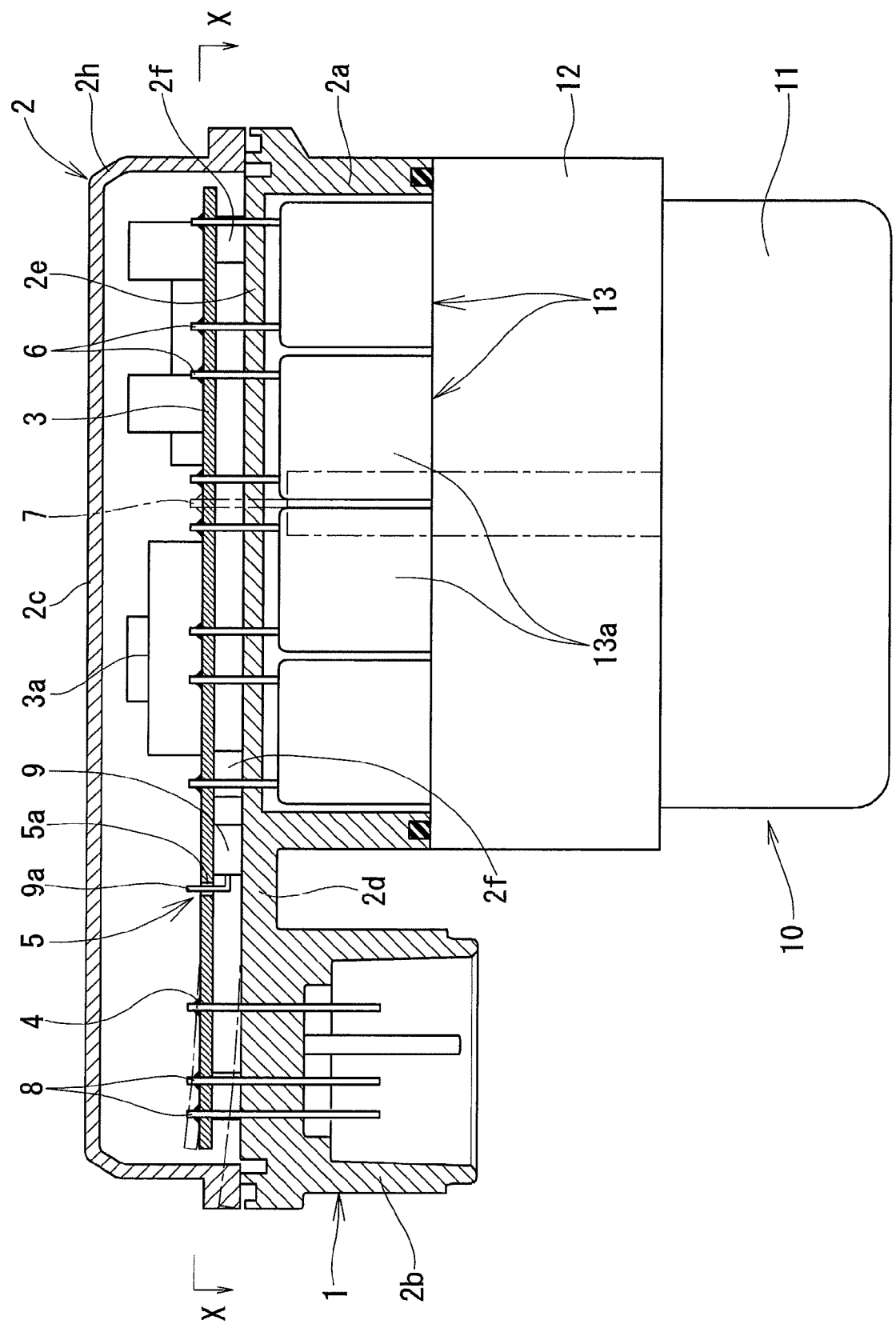
FIG. 1 is a schematic sectional view of a solenoid control apparatus embodying the present invention, as used as an electronic control apparatus for a brake system.
Figure 2:
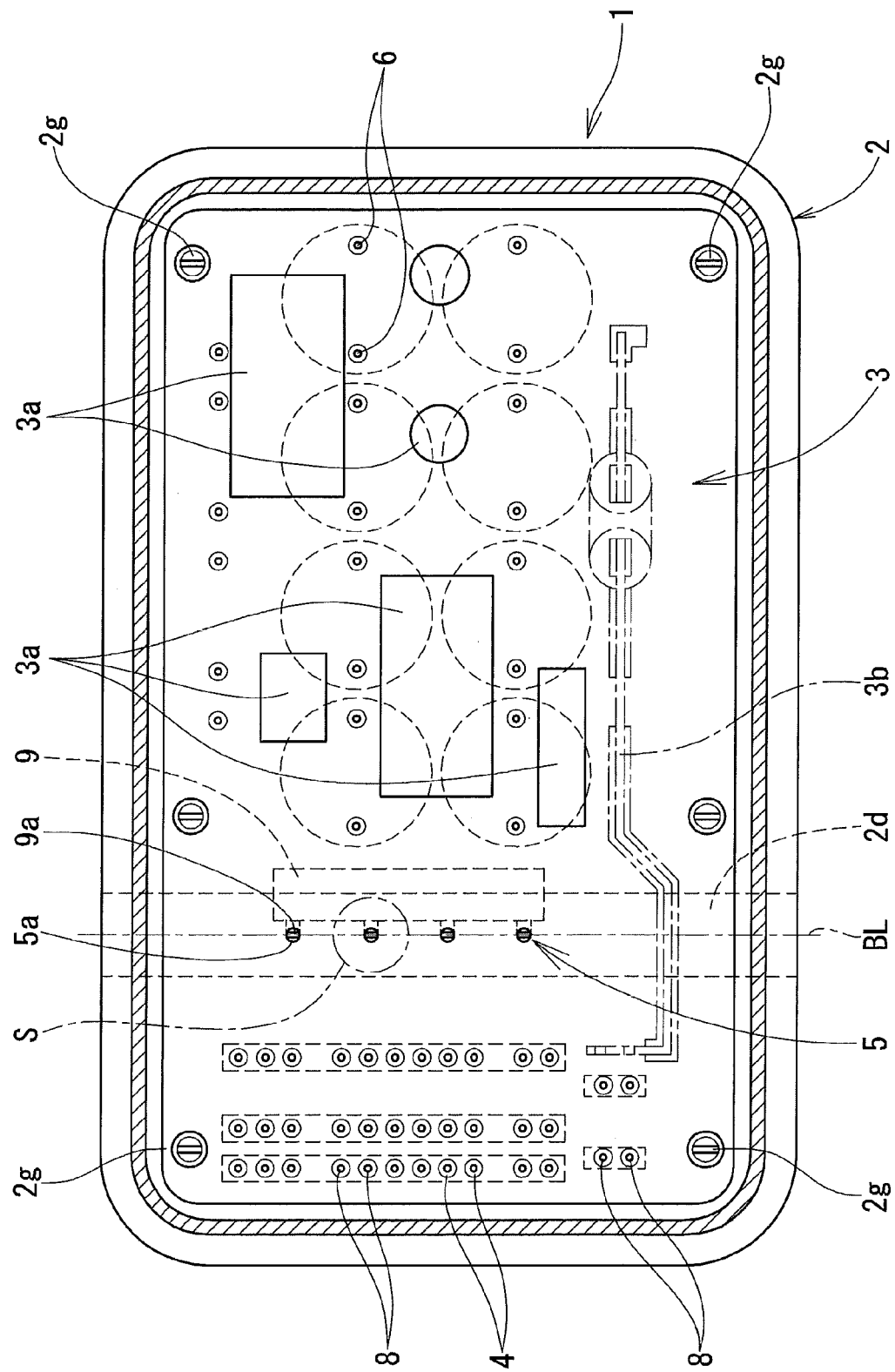
FIG. 2 is a sectional view taken along line X-X of FIG. 1.

FIGS. 1-7 show a solenoid control apparatus embodying the present invention. As shown in FIGS. 1 and 2, the solenoid control apparatus of this embodiment is an electronic control apparatus for controlling solenoid valves and a motor in a vehicle brake hydraulic control system 10.

The vehicle brake hydraulic system 10 comprises the solenoid control apparatus 1 embodying the invention (which is, as mentioned above, an electronic control apparatus), a motor 11, a pump (not shown; mounted in a hydraulic block 12) driven by the motor 11, and solenoid valves 13 having valve portions for selectively connecting and disconnecting hydraulic lines and adjusting the degree of opening of the respective hydraulic lines.

The solenoid control apparatus 1 comprises a resin housing 2, a rigid circuit board 3 carrying electronic parts 3a such as an electronic control unit (ECU), capacitors, resistors, diodes, and a choke coil, and solenoid coils 13a of the solenoid valves 13.

The resin housing 2 includes a solenoid mounting portion 2a in which the solenoid coils 13a of the solenoid valves 13 are mounted, an overhanging connector portion 2b extending in the direction of the top surface of the circuit board 3 and integrally connected to one side of the solenoid mounting portion 2a through a connecting portion 2d, and a circuit board mounting portion 2c provided over the area from the solenoid mounting portion 2a to the connector portion 2b so as to be adjacent to the solenoid mounting portion 2a and the connector portion 2b. The interior of the solenoid mounting portion 2a is separated from the interior of the circuit board mounting portion 2c by a partition wall 2e.

The circuit board 3 is mounted in the circuit board mounting portion 2c of the resin housing 2 while being supported on mounts 2f formed on the top surface of the partition plate 2e. The circuit board 3 is held in position on the mounts 2f by press-fitting retaining pins 2g with a slot which protrudes vertically from the mounts 2f into through holes formed in the circuit board 3. But instead, the circuit board 3 may be held in position on the mounts 2f by screws. The opening of the circuit board mounting portion 2c is closed by the partition wall 2e.

The solenoid coils 13a are mounted in the solenoid mounting portion 2a. The solenoids have terminals 6 which extend through the partition wall 2e and the circuit board 3 and soldered to the electrical circuit on the circuit board 3 at respective soldered portions 4 in FIG. 1. A terminal 7 of a power supply line to the motor 11 is also soldered to the electrical circuit on the circuit board 3 at a soldered portion 4. The connector portion 2b has terminals 8 extending through the bottom wall of the connector portion and the circuit board 3 and soldered to the electrical circuit on the circuit board 3 at respective soldered portions 4.

The valve portions (not shown) of the solenoid valves 13, which selectively connect and disconnect the hydraulic lines and adjust the degree of opening of the respective hydraulic lines, are located in the hydraulic block 12, while the solenoid coils 13a, which drive the valve bodies of the respective valve portions, are mounted to the hydraulic block 12. The solenoid coils 13a each comprise a coil element that generates a magnetic field, a yoke surrounding the coil element, a movable iron core for driving the valve body, a fixed iron core which applies a magnetic attraction force to the movable iron core, and a coil spring biasing the movable iron core toward the valve-closing or valve-opening position (none of these elements are shown).

The solenoid valves 13a are mounted to the hydraulic block 12 on its side opposite to the side on which the motor 11 is mounted, and is covered and protected by the resin housing 2 of the solenoid control apparatus 1.

The ECU on the circuit board 3 of this vehicle brake hydraulic control system 10 determines whether or not it is necessary to reduce pressure, reincrease pressure, or hold pressure in respective wheel cylinders for applying braking force to the respective vehicle wheels based on information from e.g. sensors for monitoring the behavior of the vehicle and pressure sensors in the hydraulic block 12, and carries out the necessary pressure control by driving the motor 11 and the solenoid valves 13.

During use of the vehicle brake hydraulic control system 10, the resin housing 2 is deformed by heat from the environment or heat from the terminals. Typically, the housing 2 is deformed such that the connector portion 2b is warped around the connecting portion 2d as shown by the chain line in FIG. 1.

In order to protect the soldered portions 4 from stress due to such warping of the housing, the circuit board 3 of the solenoid control apparatus 1 according to the present invention has a reduced-rigidity portion 5. The reduced-rigidity portion 5 shown in FIGS. 1 and 2 comprises a small number of holes 5a with a circular section formed through the circuit board 3 at its portion corresponding to the connecting portion 2d of the resin housing 2, which is provided between the solenoid mounting portion 2a and the connector portion 2b, so as to be spaced apart from each other at suitable distances.

The through holes 5a reduce the amount of material per unit area of the reduced-rigidity portion 5, thus reducing the rigidity of the circuit board 3 at its reduced-rigidity portion 5. This allows the reduced-rigidity portion 5 to be deformed more easily than the remaining part of the circuit board 3. The amount of material forming the reduced-rigidity portion 5 is reduced by adjusting the pitches of the through holes 5a, the number of the through holes 5a, and/or their diameter such that when the connector portion 2b of the resin housing is warped due to thermal deformation, the circuit board 3 can be elastically deformed around the reduced-rigidity portion 5, taking also into consideration the thickness and width of the circuit board 3.

Figure 4:
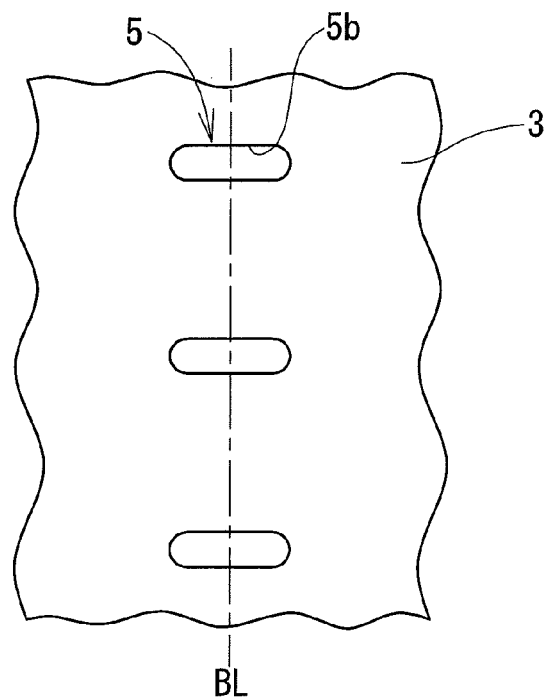
FIG. 4 is a plan view of a different reduced-rigidity portion of the circuit board.
Figure 5:
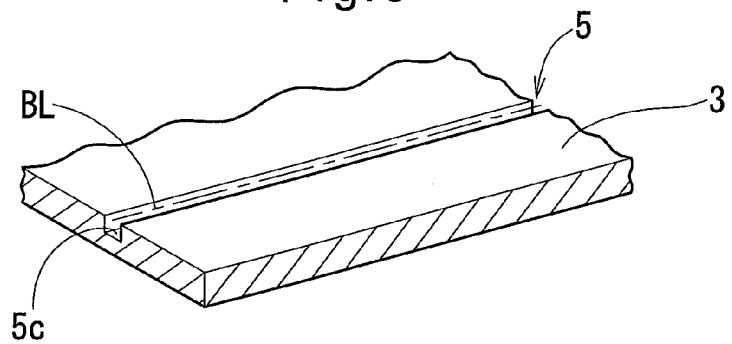
FIG. 5 is a perspective view of a still different reduced-rigidity portion of the circuit board.
Figure 6:
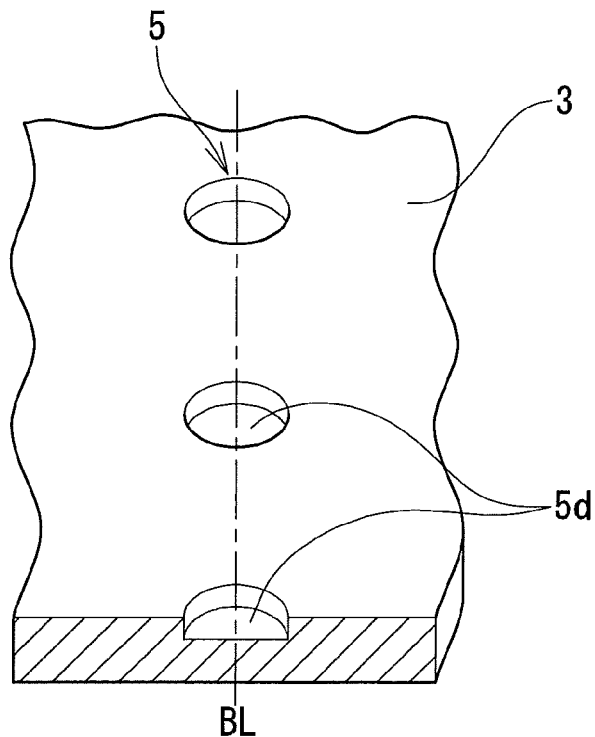
FIG. 6 is a perspective view of a yet different reduced-rigidity portion of the circuit board.

FIG. 4 shows a different reduced-rigidity portion 5, which comprises a plurality of elongated holes 5b formed through the circuit board 3. Further alternatively, the reduced-rigidity portion 5 may comprise a groove 5c shown in FIG. 5, or a plurality of recesses 5d spaced apart by suitable distances from each other. Either of the groove 5c and the recesses 5d may be formed on either side of the circuit board 3, or if they are shallow, they may be formed on both sides of the circuit board 3 such that the groove or the recesses on one side align with the groove or the recesses on the other side in the thickness direction of the circuit board.

Preferably, the reduced-rigidity portion 5 extends in the longitudinal direction BL (see FIG. 2) of the connecting portion 2d of the resin housing 2 as viewed from top of the circuit board 3.

Also preferably, the circuit board 3 includes a heat dissipating member 9 having heat absorbing protrusions 9a which are press-fitted in the respective through holes 5a forming the reduced-rigidity portion 5.

The heat dissipating member 9 may be a dedicated heat dissipating piece or heat dissipating plate. Otherwise, a bus bar for electric power distribution which is attached to the circuit board 3 may be used as the heat-dissipating member 9.

Figure 3A:
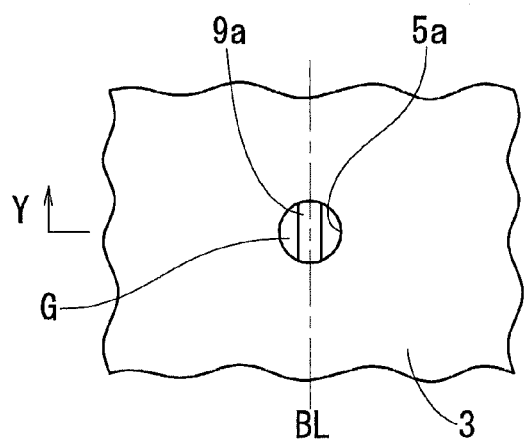
FIG. 3A is a enlarged plan view of a portion of FIG. 2 enclosed in a circle S of broken line in FIG. 2.
Figure 3B:
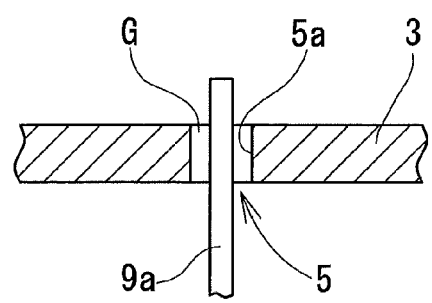
FIG. 3B is a sectional view taken along line Y-Y of FIG. 3A.

As shown in FIGS. 3A and 3B, the heat absorbing protrusions 9a are press-fitted in the respective through holes 5a such that gaps G are defined between the inner surface of each through hole 5a and the heat absorbing protrusion 9a in the direction perpendicular to the longitudinal direction BL, as viewed from top of the circuit board 3. The gaps G prevent the protrusions 9a from significantly reducing the freedom of deformation of the circuit board 3 at the reduced-rigidity portion 5.

In FIGS. 3A and 3B, there are substantially no gaps between the inner surface of each through hole 5a and the protrusion 9a in the longitudinal direction BL. But if the protrusions 9a are brought into line contact with the inner surfaces of the respective through holes 5a, gaps form in the longitudinal direction BL too. In such a case, the gaps G in the direction perpendicular to the longitudinal direction BL should be set to be larger than the gaps in the longitudinal direction. With this arrangement, the reduced-rigidity portion 5 can be deformed to a larger degree than when the gaps in the direction perpendicular to the longitudinal direction are smaller than the gaps in the longitudinal direction, so that even if the connector portion of the resin housing is thermally deformed to a relative large degree, stress can be effectively reduced.

Figure 7:
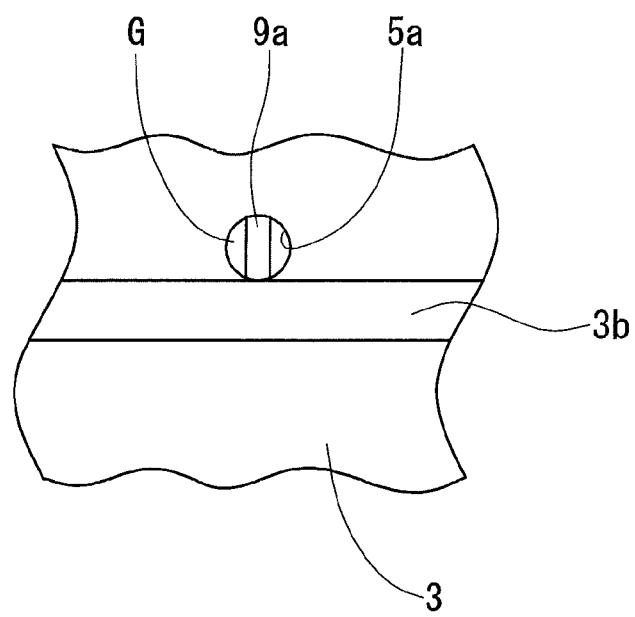
FIG. 7 is a plan view of a modified reduced-rigidity portion of which the through holes are in contact with wiring pattern in the power distribution line leading to the motor.

If, as shown in FIG. 7, the circuit board has a wiring pattern 3b (which is a bus bar in FIG. 7, but may be printed wiring instead) for a power source circuit through which electric power is supplied to the motor 11, the through holes 5a, in which the heat absorbing protrusions 9a of the heat dissipating member 9 are press-fitted, are preferably provided in contact with the wiring pattern so that heat generated from the wiring pattern when electricity is passed through the wiring pattern can be efficiently transferred to the heat dissipating member 9 and dissipated.

What is claimed is:
1. A solenoid control apparatus comprising:
a housing made of resin and including a solenoid mounting portion, an overhanging connector portion having terminals and integrally connected to one side of the solenoid mounting portion though a connecting portion, and a circuit board mounting portion provided over an area from the solenoid mounting portion to the connector portion so as to be adjacent to the solenoid mounting portion and the connector portion;
a circuit board having a electronic control circuit and mounted in the circuit board mounting portion so as to be supported by supported by the housing, and connector portion extending in a direction of one surface of the circuit board;
solenoid coils having terminals and mounted in the solenoid mounting portion;

wherein the terminals of the connector portion and the terminals of the solenoid coils extend through the circuit board and are joined to the electrical control circuit on the circuit board;

wherein the circuit board has a reduced-rigidity portion formed in an area of the circuit board corresponding to the connecting portion of the housing, the reduced-rigidity portion being formed by reducing the amount of the material forming the circuit board; and wherein the reduced-rigidity portion comprises a plurality of through holes extending through the circuit board and spaced apart by predetermined distances from each other, and wherein the solenoid control apparatus further comprises a heat dissipating member having heat absorbing protrusions press-fitted in the respective through holes of the circuit board for dissipating heat generated in the circuit board.

2. The solenoid control apparatus of claim 1, wherein the reduced-rigidity portion extends in a longitudinal direction of the connecting portion of the housing, as viewed from top of the circuit board.

3. A solenoid control apparatus comprising:

a housing made of resin and including a solenoid mounting portion, an overhanging connector portion having terminals and integrally connected to one side of the solenoid mounting portion through a connecting portion, and a circuit board mounting portion provided over an area from the solenoid mounting portion to the connector portion so as to be adjacent to the solenoid mounting portion and the connector portion;

a circuit board having an electronic control circuit and mounted in the circuit board mounting portion so as to be supported by the housing, said connector portion extending in a direction of one surface of the circuit board;

solenoid coils having terminals and mounted in the solenoid mounting portion, wherein the terminals of the connector portion and the terminals of the solenoid coils extend through the circuit board and are joined to the electrical control circuit on the circuit board; and wherein the circuit board has a reduced-rigidity portion, an entirety of the reduced-rigidity portion being located in an area of the circuit board which overlaps the connecting portion of the housing when the circuit board overlies the housing, the reduced-rigidity portion being formed by reducing the amount of the material forming the circuit board.

4. The solenoid control apparatus of claim 1, wherein gaps are defined between the surface of each of the through holes of the circuit board and the corresponding heat absorbing protrusion in a direction perpendicular to a longitudinal direction of the connecting portion of the housing, as viewed from top of the circuit board.

5. The solenoid control apparatus of claim 4, wherein said gaps in the direction perpendicular to the longitudinal direction is larger than gaps that may be formed between the surface of each of the through holes of the circuit board and the corresponding heat absorbing protrusion in the longitudinal direction, as viewed from top of the circuit board.

6. The solenoid control apparatus of claim 1, wherein the circuit board has a wiring pattern for a power source circuit through which electric power is configured to be supplied to a motor, and wherein the heat absorbing protrusions of the heat dissipating member are in contact with the wiring pattern.

7. The solenoid control apparatus of claim 3, which is configured as an electronic control apparatus for controlling solenoid valves and a motor of a vehicle brake hydraulic pressure control system comprising the motor, a pump driven by the motor, and the solenoid valves, which include valve portions for connecting and disconnecting hydraulic lines and adjusting the degree of opening of the hydraulic lines.

8. A solenoid control apparatus comprising:

a housing made of resin and including a solenoid mounting portion, an overhanging connector portion having terminals and integrally connected to one side of the solenoid mounting portion through a connecting portion, and a circuit board mounting portion provided over an area from the solenoid mounting portion to the connector portion so as to be adjacent to the solenoid mounting portion and the connector portion;

a circuit board that is a single monolithic body;

the single monolithic body circuit board having a electronic control circuit and being mounted in the circuit board mounting portion so that the single monolithic body circuit board is supported by the housing, said connector portion extending in a direction of one surface of the circuit board;

a reduced-rigidity portion located in an area of the single monolithic body circuit board corresponding to the connection portion of the housing;

solenoid coils having terminals and mounted in the solenoid mounting portion;

wherein the terminals of the connector portion and the terminals of the solenoid coils extend through the single monolithic body circuit board and are joined to the electrical control circuit on the single monolithic body circuit board; and wherein the reduced-rigidity portion is formed by reducing the amount of the material forming the single monolithic body circuit board.

9. The solenoid control apparatus of claim 8, wherein the reduced-rigidity portion extends in a longitudinal direction of the connection portion of the housing, as viewed from a top of the circuit board.

10. The solenoid control apparatus of claim 8, which is configured as an electronic control apparatus for controlling solenoid valves and a motor of a vehicle brake hydraulic pressure control system comprising the motor, a pump driven by the motor, and the solenoid valves, which include valve portions for connecting and disconnection hydraulic lines and adjusting the degree of opening of the hydraulic lines.

11. The solenoid control apparatus of claim 8, which is configured as an electronic control apparatus for controlling solenoid valves and motor of a vehicle brake hydraulic pressure control system comprising the motor, a pump driven by the motor, and the solenoid valves, which include valve portions for connection and disconnecting hydraulic lines and adjusting the degree of opening of the hydraulic lines.

* * * * *